United States Patent [19]

Klann

[11] Patent Number: 5,782,459
[45] Date of Patent: Jul. 21, 1998

[54] SUPPORT FRAME FOR A LIFTING BRIDGE WITH A SUPPORT PLATE

[76] Inventor: Horst Klann, Terra Wohnpark 12, D-78052 Villingen-Schwenningen, Germany

[21] Appl. No.: 552,609

[22] Filed: Nov. 3, 1995

[30] Foreign Application Priority Data

Nov. 5, 1994 [DE] Germany .................. 94 17 788 U

[51] Int. Cl.[6] ............................................. B66D 1/00
[52] U.S. Cl. ................................. 254/323; 294/67.1
[58] Field of Search ......................... 254/323; 294/67.1, 294/67.4, 67.5, 67.2

[56] References Cited

U.S. PATENT DOCUMENTS

| | | | |
|---|---|---|---|
| 2,361,851 | 10/1944 | La Voy | 294/67.1 |
| 2,846,188 | 8/1958 | Pierce | 254/323 |
| 2,848,120 | 8/1958 | Harmon . | |
| 3,482,817 | 12/1969 | Ross | 294/67.1 |
| 4,030,705 | 6/1977 | Bontrager . | |
| 4,431,223 | 2/1984 | Miller | 294/67.5 |
| 4,774,386 | 9/1988 | Goodwin . | |
| 4,826,228 | 5/1989 | Dinitz et al. | 294/67.1 |
| 4,928,927 | 5/1990 | Fredrick et al. . | |

FOREIGN PATENT DOCUMENTS

| | | |
|---|---|---|
| 0 611 726 A1 | 8/1994 | European Pat. Off. . |
| 86 27 720 U | 8/1987 | Germany . |
| 9302395 U | 6/1993 | Germany . |
| 94 09 121 U | 9/1994 | Germany . |
| 94 12 054 U | 11/1994 | Germany . |

Primary Examiner—Katherine Matecki
Attorney, Agent, or Firm—McGlew and Tuttle

[57] ABSTRACT

The present invention pertains to a lifting bridge for removing and installing motor vehicle components, with at least one support rail on which at least one hoisting gear is arranged, and which has support feet at both ends. The support feet of the support rail can be supported at the top edges of an opened engine compartment of a motor vehicle, wherein the hoisting gear has a flexible pulling element. To make it also possible to use such a lifting bridge for motor vehicle engines with unfavorable arrangement of their lifting straps in space, a support plate extending essentially in a horizontal plane is provided for lifting the motor vehicle parts, and the support plate has at least one coupling element with which the support plate is detachably fastened to the pulling element wherein one or more connection elements which can be fastened at different points of the support plate are provided on the support plate for attaching the motor vehicle parts.

12 Claims, 4 Drawing Sheets

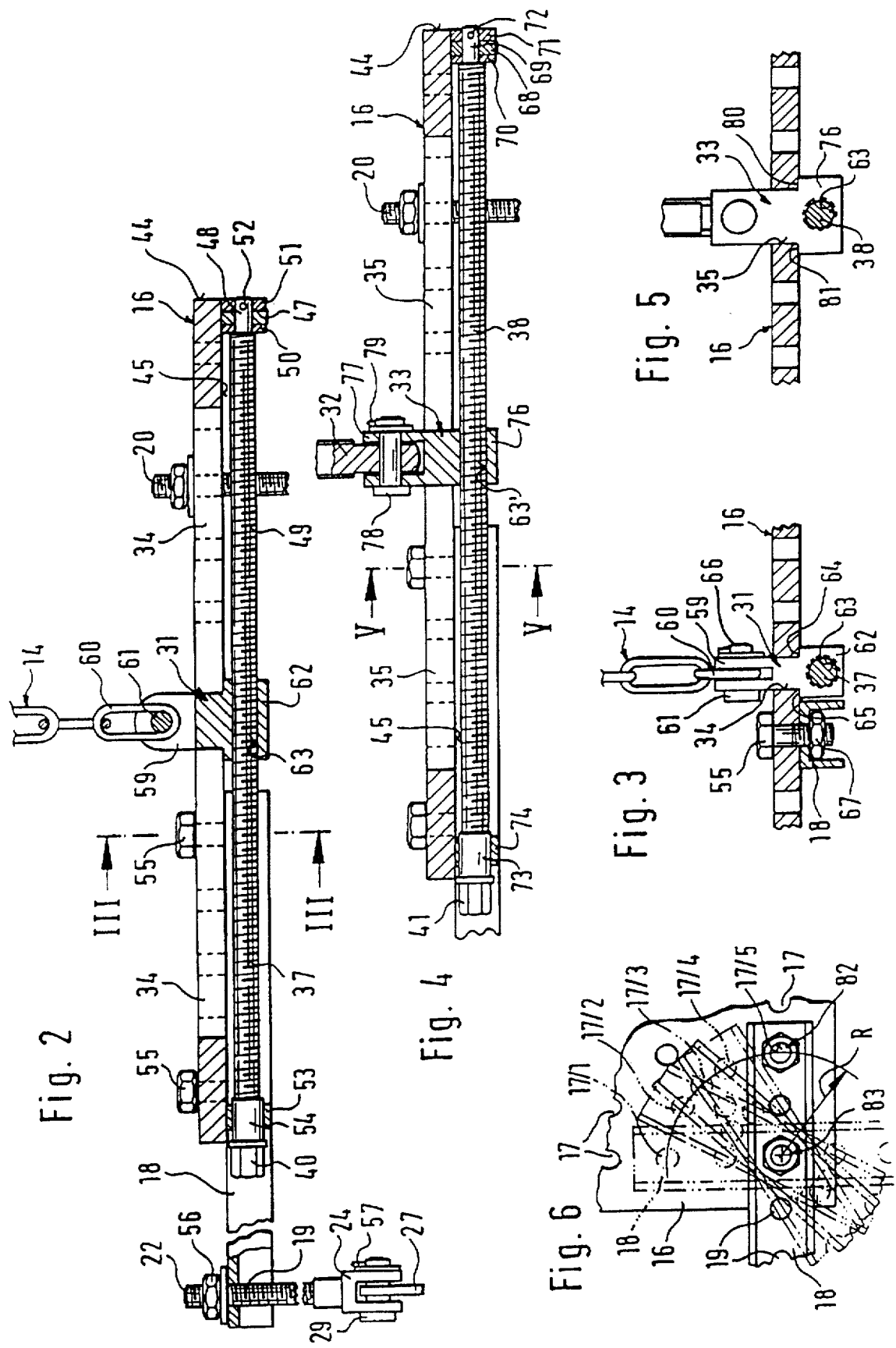

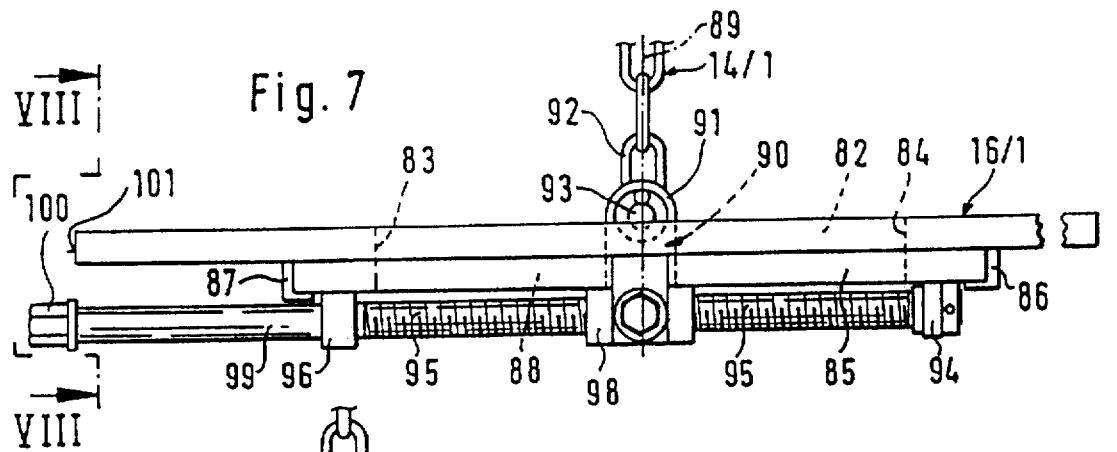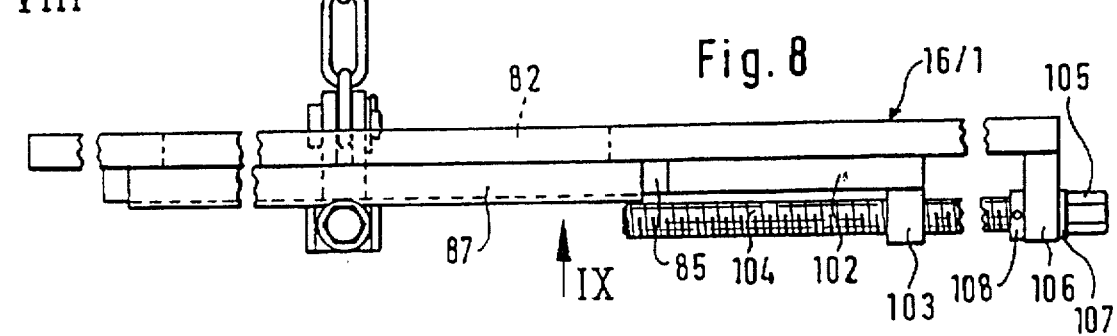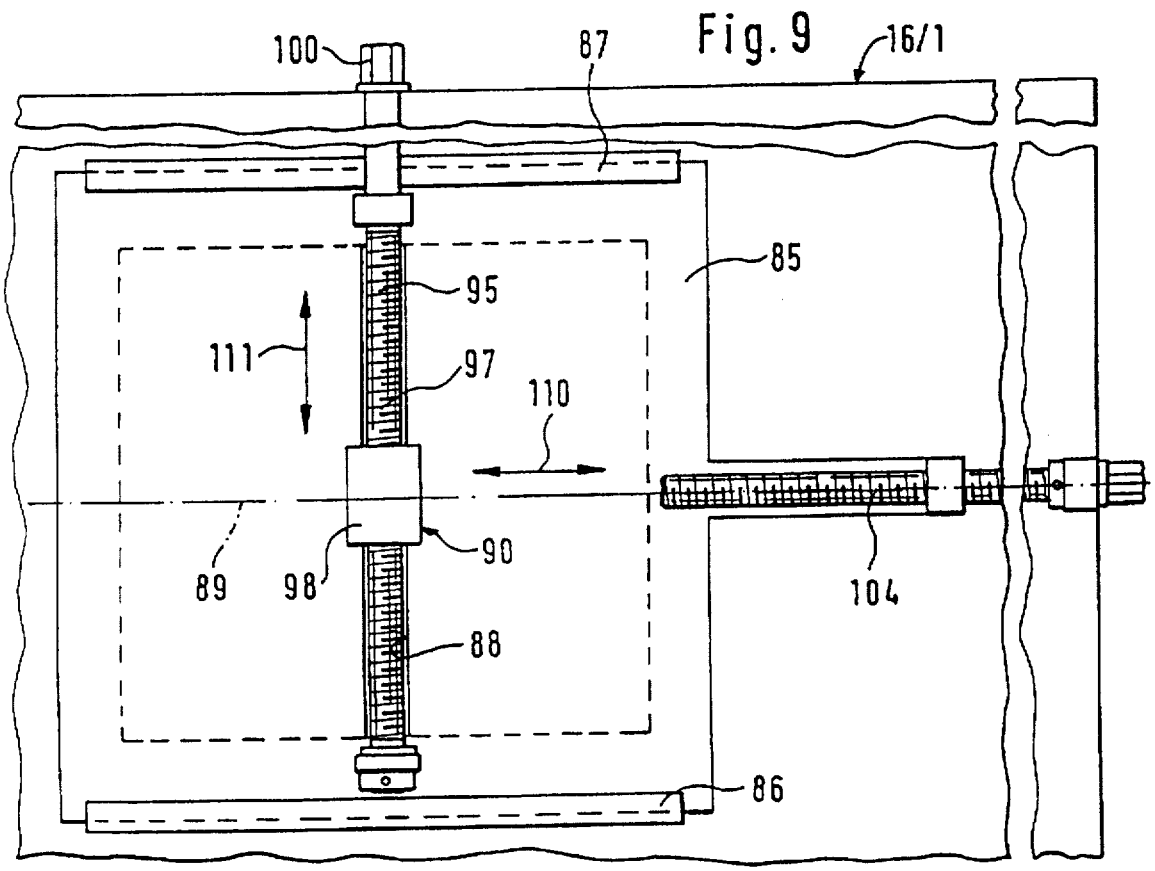

SUPPORT FRAME FOR A LIFTING BRIDGE WITH A SUPPORT PLATE

FIELD OF THE INVENTION

The present invention relates in general to a lifting bridge for removing and installing motor vehicle parts, and specifically to a bridge having a support rail, on which at least one hoisting gear is arranged and which has, at both ends, support feet, with which the support rail can be supported at the top edges of an open engine compartment of a motor vehicle, wherein the hoisting gear has a flexible pulling element.

BACKGROUND OF THE INVENTION

A related lifting bridge of this class has been known from G 93 02 395.2, which is intended for use above an engine compartment opening in which the hood has been removed or lifted. The edges of the engine compartment opening extending in the longitudinal direction of the vehicle have a horizontally extending fastening web each in the transverse direction of the vehicle for the respective fender of the vehicle, to which the respective fender is bolted or welded with a corresponding mounting web.

For use, the prior-art hoisting gear is placed with its support feet on the mounting webs of the fenders mounted on the fastening webs, and it extends essentially at right angles to the longitudinal axis of the vehicle. The support feet are connected via respective vertical struts to pivoting plates, between which two support rails, aligned in parallel to and at spaced locations from one another, are welded on. Each support rail consists of two pipes with square cross section, which are pushed telescopically into each other, so that the lifting bridge is variably adjustable to the actual distance of the mounting webs of the engine compartment opening. The two support rails are fastened to the pivoting plates such that one of their diametrical planes extends at least approximately vertically in the position of use. Two hoisting gears, which have identical design, are arranged on the support rails. Each hoisting gear has two parallel guide tubes, which are arranged in parallel at a corresponding distance from one another, and with which they are displaceably guided on the support rails. Furthermore, each of the hoisting gears is provided with a worm gear pair for actuating a flexible pulling element, which extends hanging down into the engine compartment between the support rails. The pulling elements are designed as a link chain and have a fastening hook each at their lower ends.

The prior-art lifting bridge is used to lift up an engine or even a transmission or the two together in the engine compartment of a motor vehicle, so that, e.g., damaged elements of the engine mount can be replaced. To lift up an engine, it is provided at predetermined points with lifting straps, into which the pulling hooks of the link chain can be hung. Different numbers of lifting straps and at different locations are provided in different models of vehicles, so that the prior-art lifting bridge must be arranged in extreme cases diagonally over the engine compartment to reach these holding points defined by the lifting straps. This diagonal arrangement is made possible by the fact that the support feet are rotatable around a vertical axis in relation to the support legs, so that the support feet can be arranged on the fenders in parallel to the mounting webs of the fenders with the lifting bridge extending diagonally.

However, the prior-art lifting bridge cannot be used even in the diagonal arrangement in unfavorable cases, because the mounting webs do not have sufficient stability in the front area of modern passenger car bodies due to the extreme lightweight design to support the high weight of a motor vehicle engine during lifting. Correspondingly, the holding points of the motor vehicle engine cannot be reached optimally or cannot be reached at all with the pulling hooks of the link chain. In addition, the lifted motor vehicle engine cannot be sufficiently additionally secured in the case of the prior-art lifting bridge, which leads to a hazard for the mechanic especially during work which must be performed under the engine or the engine compartment.

SUMMARY AND OBJECTS OF THE INVENTION

It is therefore the object of the present invention is to improve a lifting bridge of this class such that it can be used even in the case of unfavorable arrangements of the lifting straps of a motor vehicle engine, and an additional securing of the lifted load shall be possible.

This task is accomplished according to the present invention in that for lifting the motor vehicle parts, a support plate extending essentially in the horizontal plane is provided, which has at least one coupling element; that the coupling element can be arranged at different points on the support plate; and that one or more connection elements which can be fastened at different points of the support plate are provided on the support plate for attaching the motor vehicle parts.

It is advantageously achieved due to the embodiment of the lifting bridge according to the present invention that the lifting bridge proper with its support rails can always be placed on the fastening webs of the engine compartment in areas of the fastening webs of the engine compartment in which the fastening webs or the mounting webs of the fenders have a sufficiently high rigidity for lifting, e.g., a motor vehicle engine. Due to the coupling element being able to be arranged at different points of the support plate, the support plate can be attached to the lifting bridge in relation to the component to be lifted such that the holding points arranged at predetermined points on the component, e.g., on a motor vehicle engine, can be reached in a simple manner with the connection elements, which can be fastened at different points of the support plate. The present invention can then provide support for objects in the engine compartment which in areas of the engine compartment having edges which could not support the lifting bridge. The possibility of the flexible arrangement of the coupling element also makes it possible to attach the support plate to the lifting bridge such that the center of gravity of the overall arrangement consisting of the support plate, the connection elements, and the component to be lifted is located directly under the point of suspension of the coupling element, so that the component will not perform any undesirable swinging movements during the lifting and can be lifted up from its original position without tilting off.

One embodiment includes a ring bolt which can be screwed into corresponding threaded holes arranged in the support plate and can be fixed on the support plate by means of a nut. This embodiment is an inexpensive and simple design. For adaptation to different models of vehicles, whose suspension-points are known, it is also possible to premount a plurality of ring bolts on the support plate, so that additional mounting operations for converting the support plate by correspondingly changing the position of only one ring bolt on the support plate in the case of use for different models of vehicles with differently arranged suspension points are eliminated.

Another embodiment achieves variable adjustability of the coupling element on the support plate. The position of the coupling element on the support plate can be changed infinitely in its adjusting slot in a simple manner, with the component attached, by means of the adjusting spindle for adjustment to the actually existing center of gravity of the overall arrangement consisting of the support plate, the connection elements, and the component attached.

By having two hoisting means the support plate can be lifted variably from its horizontal plane, extending obliquely to the support rails. This may be necessary especially when removing and installing a transmission with the motor vehicle engine mounted transversely, in order to make it possible to remove the transmission from the engine compartment in the downward direction, with the motor vehicle engine tilted off. Moreover, the safety rod provided, which is arranged longitudinally adjustable between the support rails and the support plate, offers additional safety. The safety rod can be adjusted to the actual lifting height of the lifting bridge, so that the pulling elements can be relieved by the safety rod during the necessary work on the component lifted, and rupture of the pulling elements can be prevented with certainty. Maximum safety is thus achieved.

The pivotable fastening of the safety rod on its coupling element makes it possible to tilt the support plate out of its horizontal plane, which is in the starting position.

The connection elements can have a plurality of different ends to have the lifting bridge or the support plate to be used variably for different models of motor vehicles. The connection elements can then be connected to the lifting straps of the component to be attached in the simplest manner by hanging up or by means of a support pin.

Support elements fastenable to the support plate and to the connection elements make it is possible to reach even points of attachment on, e.g., a motor vehicle engine mounted lengthwise in a motor vehicle, which are not located under the support plate. This offers the advantage that the size of the support plate does not need to cover the complete engine compartment opening, but it may be substantially smaller and consequently also lighter. The support element can now be fastened on the support plate in differently positioned support holes in different directions in relation to the support plate.

The connection elements can be adjustable in length to have the support plate to always be used in its essentially horizontal starting position if the holding points of the components to be lifted are arranged at different heights. Due to the longitudinal adjustability of the connection elements and to their adjustability in height on the support plate, it is possible to reach even holding points of a motor vehicle engine and/or of a transmission, which holding points are arranged at different heights, in the horizontal starting position of the support plate.

The coupling positioning means of the present invention offers the possibility of variable adjustment of the position of the coupling elements in relation to the support plate, wherein the coupling element is displaceable in relation to the support plate both in the longitudinal direction and the direction at right angles to the support plate. This makes possible a variable adjustment to take into account the actual location of the center of gravity of the overall arrangement consisting of the support plate, the connection elements, and the component lifted, especially when only one hoisting gear with one pulling element and also only one correspondingly arranged coupling element are used. Due to the adjusting spindles provided, the adjustment process can also be carried out under load, i.e., with the component lifted, so that changes in the center of gravity can also be taken into account at any time during mounting operations to be carried out.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 shows a sectional view of the support plate from FIG. 1 through one of the pulling elements, FIG. 3 shows a partial section III—III from FIG. 2, FIG. 4 shows a sectional view of the support plate from FIG. 1 through the safety rod, FIG. 5 shows a partial view IV—IV from FIG. 4, FIG. 6 shows a partial view of a corner area of the support plate with an additional support element, FIG. 7 shows a front view of a second embodiment of a support plate with adjusting plate, FIG. 8 shows a partial view VIII—VIII from FIG. 7, FIG. 9 shows a bottom view IX of the support plate with the adjusting plate from FIG. 8.

DETAILED DESCRIPTION OF THE PREFERRED EMBODIMENT

Figure 1:
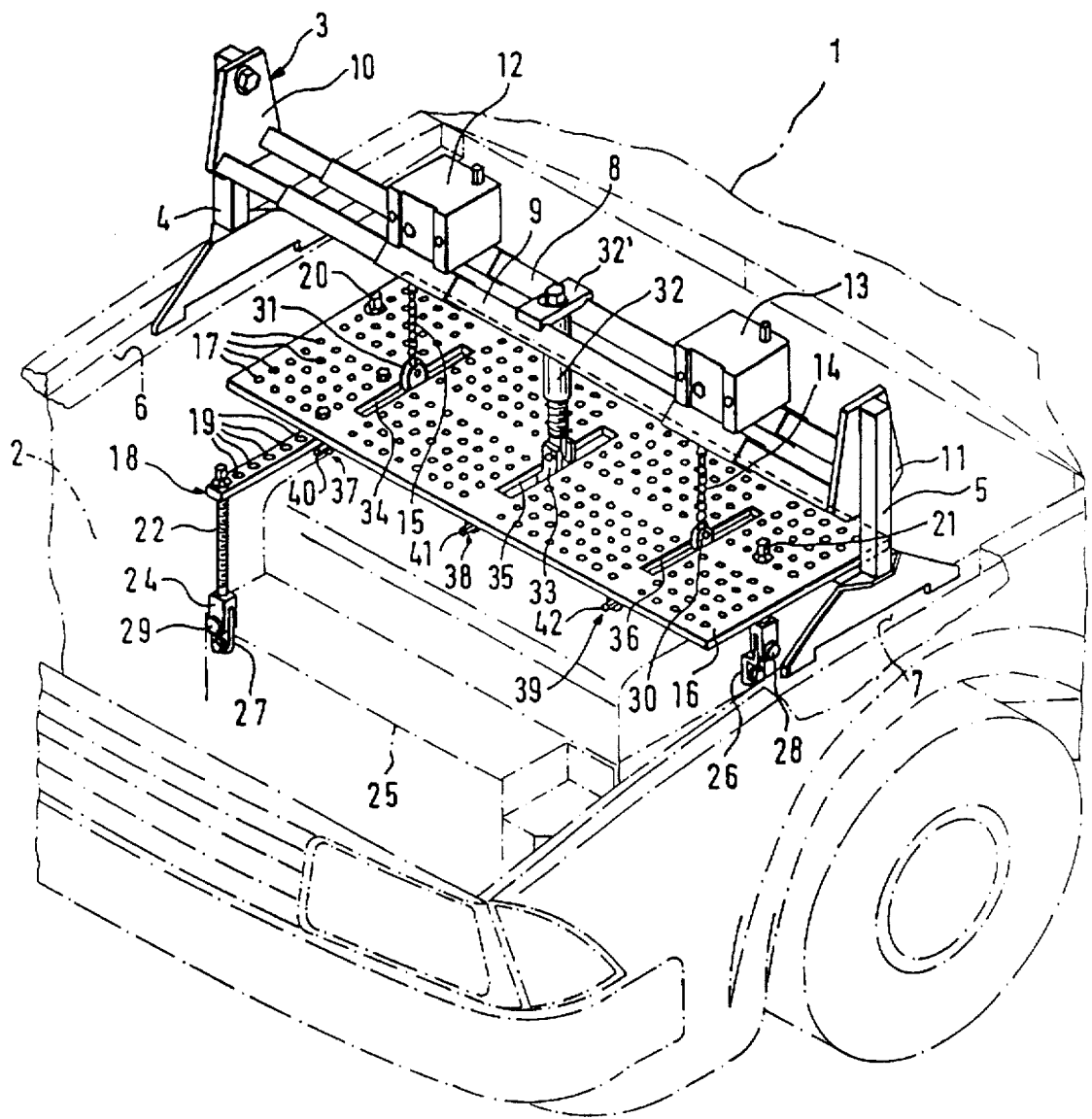
FIG. 1 shows a perspective view of a lifting bridge with a support frame in use over the open engine component of a motor vehicle.

FIG. 1 shows a partial perspective view of the front part of a motor vehicle 1 with the engine compartment 2 opened. A lifting bridge 3 is arranged above the engine compartment 2, and the lifting bridge 3 is provided with two vertical props 4, 5, by which the lifting bridge 3 is placed on the fender mounting webs 6 and 7 of the motor vehicle 1.

The lifting bridge 3 has two support rails 8, 9, which extend essentially at right angles to the longitudinal direction of the vehicle in the working position. The two support rails 8, 9 are pivotably mounted on the corresponding vertical prop 4 or 5 via pivoting plates 10, 11 welded to their ends. Two hoisting gears 12, 13 are guided longitudinally displaceably on the support rails 8, 9. The hoisting gears 12, 13 have a respective pulling element 14 or 15, designed as a link chain. At the lower ends of the pulling elements 14, 15 a support plate 16 is fastened. The support plate 16 has an essentially rectangular design and extends, in its vertical longitudinal plane of symmetry in the starting position, approximately in parallel to the support rails 8, 9, and at right angles to the longitudinal central axis of the motor vehicle 1.

The support plate 16 has a plurality of support holes 17, which are used to fasten the connection elements. As is apparent from FIG. 1, a support element 18, which projects forward beyond the support plate 16 in the longitudinal direction of the vehicle, is bolted to the support plate 16. The support element 18 is designed as a channel section and has a plurality of support holes 19, which are used to fasten the support element 18 on the support plate 16 by means of corresponding screw connections, on the one hand, and to accommodate a connection element, on the other hand.

The connection elements provided are, e.g., three draw spindles 20, 21, 22. The draw spindles 20 and 21 are fastened in the corresponding support holes 17 of the support plate 16 in a height-adjustable manner. The draw spindle 22 is fastened at the outer end of the support element 18 in a corresponding support hole 19 of the support element 18 in a height-adjustable manner. Only the top end of the draw spindle 20 projecting over the support plate 16 in the upward direction is visible in FIG. 1. The draw spindles 20, 21, 22 have a respective support fork 23, 24 at their lower ends, and the support fork of the draw spindle 20 is not visible in the drawing. The support forks 23, 24 are used, e.g., to attach to a motor vehicle engine 25, which is represented by phantom lines in FIG. 1 and is provided with holding straps 26, 27 at predetermined points for this purpose. For being fastened to the corresponding support fork 23, 24, the holding straps 26 and 27 have a respective cross hole at their top ends, so that they can be brought into positive-locking engagement with the corresponding support fork 23 or 24 by means of a respective cotter 28, 29.

The support plate 16 is attached to the pulling elements 14, 15 via two coupling elements 30, 31.

To secure the support plate 16, a safety rod 32 is provided, which is fastened with its top end longitudinally displaceably to the support rails 8, 9 via a holding plate 32' extending at right angles to the support rails 8, 9. A lower end of the safety rod 32 is fastened to the support plate 16 via a corresponding coupling element 33. The safety rod 32 is fastened pivotably to the coupling element 33 around an axis extending substantially in parallel to the longitudinal central axis of the motor vehicle 1. The coupling elements 30, 31, 33 are arranged displaceably on the support plate 16 by coupling positioning means, in a respective adjusting slot 34, 35, 36 substantially in parallel to the longitudinal central axis of the motor vehicle 1 and substantially at right angles to the support plate 16. To displace the coupling elements 30, 31, 33, an adjusting spindle 37, 38, 39, which is provided with a respective front-side drive hexagon 40, 41, 42, is provided under the support plate 16.

FIG. 2 shows a partial section through the support plate 16, wherein the section passes through the adjusting spindle 37 from FIG. 1. FIG. 2 also shows the U-shaped support element 18 with the corresponding draw spindle 22. The adjusting spindle 37 is arranged under the support plate 16 and extends substantially in parallel to the plane of the support plate 16, from the front edge 43 of the support plate 16 to its rear edge 44. A vertically downwardly directed bearing web 47 is fastened in the area of the rear edge 44 of the support plate 16 on the underside 45 of the support plate. The adjusting spindle 37 is rotatably mounted in the bearing web 47 with a corresponding bearing journal 48. The bearing journal 48 has a reduced diameter compared with the threaded section of the adjusting spindle 37 and passes through the bearing web 47. A stop disk 50, which is mounted on the bearing journal 48 of the adjusting spindle 37, is mounted between the bearing web 47 and the threaded section 49 of the adjusting spindle 37. At its rear end, which passes through the bearing web 47, the bearing journal 48 is provided with a disk-shaped fastening plate 51, which is captively fastened to the bearing journal 48 with, e.g., a grooved pin 52. The adjusting spindle 37 with its bearing journal is thus axially non-displaceably mounted on the bearing web 47 via the stop disk and the fastening plate. In the area of the front edge 43, the support plate 16 has a second, vertically downwardly directed bearing web 53, in which the adjusting spindle 37 is mounted with cylindrically designed, drive hexagon-side bearing section 54. The drive hexagon 40 of the adjusting spindle 37 projects over the front edge 43 of the support plate 16 in the horizontal direction, so that it is freely accessible for actuating the adjusting spindle 37. The support element 18 is fastened on the underside 45 by means of two bolts 55. The support element 18 extends over the support plate 16 on the front edge side and has at its outer end the draw spindle 22, which is passed through the outermost support hole 19 from bottom to top and is fastened to the support element 18 by means of a corresponding adjusting nut 56 in a height-adjustable manner.

At its lower end, the draw spindle 22 has the support fork 24, which is used to fasten the draw spindle 22 to the holding strap 27 of the motor vehicle engine. Both the support fork 24 and the holding strap 27 are provided with through holes for this purpose such that the holding strap 27 and the support fork 24 can be connected to one another by means of the cotter 29 in a positive-locking manner. A cotter pin 57 is provided to secure the cotter 29.

The coupling element 31 is longitudinally displaceably guided in the adjusting slot 34, and it has a coupling fork 59, which projects vertically upwardly over the support plate. Between the legs of the coupling fork 59, the pulling element 14, designed as a pull chain, is connected to the coupling element 31 with its lowermost chain link 60 via a corresponding cotter 61. Under the support plate 16, the coupling element 31 has an adjusting section 62, which is provided with a through-threaded section 63 and by means of which the coupling element 31 is longitudinally displaceable by the adjusting spindle 37 in the adjusting slot 34.

As is shown in FIG. 3, the adjusting section 62 of the coupling element 31 is wider than the adjusting slot 34, and it has two stop surfaces 64 and 65, which are laterally in contact with the underside 45 of the support plate 16. The support plate 16 is held by the coupling element 31 via the stop surfaces 64, 65, and it is guided longitudinally displaceably and nearly clearance-free in the adjusting slot 34. To fasten the lower chain link 60 of the pulling element 14, the cotter 61 is passed through corresponding holes of the coupling fork 59 and is held captively by means of a securing cotter pin 66. FIG. 3 also shows that the support element 18 is bolted to the support plate 16 with two fastening bolts 55 and corresponding nuts 67.

The adjusting drive of the coupling element 30 with its adjusting spindle 39 in its adjusting slot has the same design as the above-described adjusting drive of the coupling element 31 and is not shown in detail in the drawing.

FIG. 4 shows a section of the support plate 16, which is located approximately in the longitudinal plane of symmetry of the adjusting slot 35 of the support plate 16. The adjusting spindle 38, which is mounted under the support plate 16 corresponding to the adjusting spindle 37, is arranged under the support plate 16, i.e., a bearing web 68, in which the adjusting spindle 38 is rotatably mounted by means of a bearing journal 69, is provided in the area of the rear edge 44 of the support plate 16. A stop disk 70 and a fastening plate 71 are also provided for the axially displaceable fastening of the adjusting spindle with its bearing journal 69 in the bearing web 68, and the fastening plate 71 is firmly fastened to the bearing journal 69 by means of a grooved pin 72. The adjusting spindle 38 has the same design as the adjusting spindle 37 and is rotatably mounted on the drive hexagon side on the underside 45 of the support plate 16 via a bearing section 73 and a corresponding bearing web 74.

The adjusting spindle also projects with its drive hexagon 41 over the support plate 16 on the front edge side.

The coupling element 33 of the safety rod 32 has an adjusting section 76, which is arranged under the support plate 16, is provided with a through-threaded section 75, and via which the coupling element 33 is longitudinally displaceably movable in the adjusting slot 35 via the adjusting spindle 38. To accommodate the safety rod 32, the coupling element 33 has a coupling fork 77. Between the fork spars of the coupling fork 77, the safety rod 32 extends and is pivotably mounted in the coupling fork 77 by means of a cotter 78. The cotter 78 is also captively secured by a securing cotter pin 79 in the corresponding through holes of the coupling fork.

As is shown in FIG. 5, the width of the coupling element 33 is adjusted to the width of the adjusting slot 35 such that the coupling element 33 is guided longitudinally displaceably and approximately clearance-free in the adjusting slot 35. The adjusting section 76 of the coupling element 33, which is arranged under the support plate 16, is wider than the adjusting slot 35 and forms two stop surfaces 80 and 81. By means of the stop surfaces 80 and 81, the coupling element 33 is longitudinally displaceably in contact with the underside 45 of the support plate 16. The adjusting spindle 38 engages the through-threaded section 63' of the adjusting section 76 in this position.

FIG. 6 shows a bottom view of a corner area of the support plate 16. The support element 18 is bolted to the underside with two bolt connections 82, 83. The support holes 17 provided in the support plate 16 are arranged such that the support element 18 can be bolted to the support plate 16 with the support element 18 extending in different directions in relation to the support plate 16. For example, the support holes 17/1, 17/2, 17/3, 17/4 and 17/5 are arranged on a radius R, which corresponds, e.g., to twice the distance between two adjacent support holes 19 of the support element 18. By correspondingly selecting the arrangement of the support holes 17/1, 17/2, 17/3, 17/4 and 17/5, the support element 18 can be bolted to the support plate 16 in different angular positions in relation to the support plate 16, as is represented in FIG. 6 by the positions of the support element 18, represented by phantom lines. It is achieved due to this possibility of mounting the support element 18 on the underside of the support plate 16 that the support plate 16 can be designed as a relatively small support plate, and it is yet possible to reach different holding points, e.g., on a motor vehicle engine, which are not arranged directly vertically under the support plate, due to the corresponding arrangement of the support element 18 on the support plate 16.

It is obvious that the support holes 17/1 through 17/5 can be arranged not only in the corner areas of the support plate 16, as was described above, but such an arrangement of the support holes 17 may also be provided in any area of the support plate 16, so that the support element 18 can also be bolted to the support plate 16 in a middle area of the support plate 16 in different angular positions in relation to the support plate 16.

Due to the longitudinal displaceability of the coupling elements 30, 31 and 33, it is also possible to arrange the support plate 16 in relation to the support rails 8, 9 of the lifting bridge 3 such that it will no longer extend in parallel, but obliquely to the support rails 8, 9 of the lifting bridge 3 with its vertical longitudinal axis of symmetry or with its front edge 43 and its rear edge 44. It is achieved as a result that the support plate 16 with its support holes 17 is rotatable above the motor vehicle engine such that it is adjustable with its support holes 17 or with one of its support holes 17 vertically above the holding point arranged correspondingly on the motor vehicle engine 25. The corresponding holding point can thus be reached in a simple manner with a draw spindle 20, 21 or 22 arranged in the aligned support hole 17.

Variable use of the support plate 16 or of the entire lifting bridge 3 is made possible by the arrangement of the support plate 16 according to the present invention with its coupling elements 30, 31, 33 arranged displaceably in the corresponding adjusting slots 34, 35, 36, as well as by the support element 18 provided, a plurality of which may, of course, also be provided.

FIG. 7 shows a front view of another embodiment of the present invention with a support plate 16/1. The support plate 16/1 has an approximately rectangular opening 82, which is covered by an adjusting plate 85 in the starting position. The opening 82 is limited by a front edge 83 and a rear edge 84, which extend essentially in parallel to the longitudinal central plane 89 of the support plate 16/1. The adjusting plate 85 is arranged on the underside of the support plate 16/1 and is displaceably guided along the support plate 16/1 by means of two approximately L-shaped guide rails 86, 87 extending in parallel to the longitudinal central plane 89 of the support plate 16/1.

Like the support plate 16, the support plate 16/1 is also provided with support holes, which are not shown in the drawing for clarity's sake.

The adjusting plate 85 has a central adjusting slot 88, which extends at right angles to the longitudinal central plane 89 of the support plate 16/1 and at right angles to the guide rails 86, 87, and in which a coupling element 90 is arranged guided displaceably at right angles to the longitudinal central plane 89. The coupling element 90 is provided with a coupling fork 91 for coupling with the pulling element 14/1, which is designed as a link chain. With its lowermost chain link 92, the coupling element 14/1 is fastened between the two legs of the fork (FIG. 8) via a corresponding support bolt 93. A bearing web 94, in which an adjusting spindle 95 is mounted rotatably and non-displaceably in its axial direction at right angles to the longitudinal central plane 89, is provided on the underside of the adjusting plate 85 in the area of one of the coupling element's guide rails 86. A second bearing web 96, through which the adjusting spindle 95 passes axially, is provided in the area of the coupling element's second guide rail 87 on the underside of the adjusting plate 85.

For displacing the coupling element 90 in the adjusting slot 88, the adjusting spindle 95 has a threaded section 96, which engages a corresponding female threaded section of an adjusting section 98 of the coupling element 90.

For mounting in the bearing web 96, the adjusting spindle 95 is provided with a corresponding bearing shaft section 99, with which it is mounted rotatably and approximately without clearance in the bearing web 96. To actuate the adjusting spindle 95, the latter has a drive hexagon 100, which horizontally projects beyond the front face side 101 of the support plate 16/1 and is thus freely accessible for the actuation of the adjusting spindle 95.

FIG. 8 shows a side view VIII—VIII from FIG. 7 of the support plate 16/1. Under the support plate 16/1, the adjusting plate 85 is arranged directly under the opening 82 of the support plate 16/1 in the starting position shown. The front guide rail 87, whose length is shorter in this exemplary embodiment than the length of the adjusting plate 85, is also recognizable.

The adjusting plate 85 has an adjusting web 102, which extends in parallel to the longitudinal central plane of the support plate 16/1 and in parallel and symmetrically to the guide rails 86 and 87. At its free end, the adjusting web 102 has a vertically downwardly directed adjusting plate 103, into the threads of which a second adjusting spindle 104 can be screwed. The adjusting spindle 104 extends in parallel to the adjusting web 102 and terminates with its free threaded end approximately in the area of the guide rail 86 or 87 in the starting position of the adjusting plate 85 shown. The adjusting spindle 104 is provided with a drive hexagon 105 and is mounted rotatably and axially non-displaceably in a bearing web 106 on the underside of the support plate 16/1.

To fix the adjusting spindle 104 axially in the bearing web 106, the adjusting spindle 104 is provided between its drive hexagon 105 and the bearing web 106 with a radially outwardly projecting, circular flanged web 107, and a fastening plate 108 is arranged opposite this flanged web on the adjusting spindle 104. The fastening plate 108 is at a spaced location from the flanged web 107, and this distance approximately corresponds to the width of the bearing web 106. The fastening plate 108 is secured axially non-displaceably on the adjusting spindle by means of a grooved pin 108.

FIG. 9 shows the overall arrangement of the support plate 16/1 with the adjusting plate 85 as well as the adjusting spindles 95 and 104 as a bottom view IX from FIG. 8.

By actuating the adjusting spindle 104, the setting plate 103 of the adjusting plate 85 is displaced in the guide rails 86, 87 in parallel to the longitudinal central plane 89 of the support plate 16/1 in one of the two directions indicated by the double arrow 110, depending on the direction of rotation of the adjusting spindle 104. The adjusting section 98 of the coupling element 90 is also displaced with the adjusting plate 85 at the same time, so that the position of the coupling element is variably adjustable in relation to the support plate 16/1 by means of the adjusting spindle 104 in parallel to the longitudinal central plane 89. The adjustment path is limited by the width of the opening 82, which approximately corresponds to the length of the opening 82.

The coupling element 90 is displaceable in its adjusting slot 88 by means of the adjusting spindle 95 at right angles to this direction of movement and at right angles to the longitudinal central plane 89. By actuating the adjusting spindle 95 at its drive hexagon 100, the coupling element 90 with its adjusting section 98 is moved by the threaded section 97 of the adjusting spindle 95 at right angles to the longitudinal central plane 89 in one of the two directions indicated by the double arrow 111, depending on the direction of rotation, and it is correspondingly also displaced in relation to the adjusting plate 85 and consequently also in relation to the support plate 16/1. The adjustment path for the coupling element 90 at right angles to the longitudinal central plane is limited by the length of the adjusting slot 88, and the length of the adjusting section 88 corresponds to the corresponding transverse extension of the opening 82.

It is obvious that the support plate 16 may be secured with, e.g., two safety rods even if only one hoisting gear is provided. The safety rods are to be arranged in this case in the area of the hoisting gears from FIG. 1, and one hoisting gear is to be arranged centrally in the area of the safety rod from FIG. 1.

Figure 10:
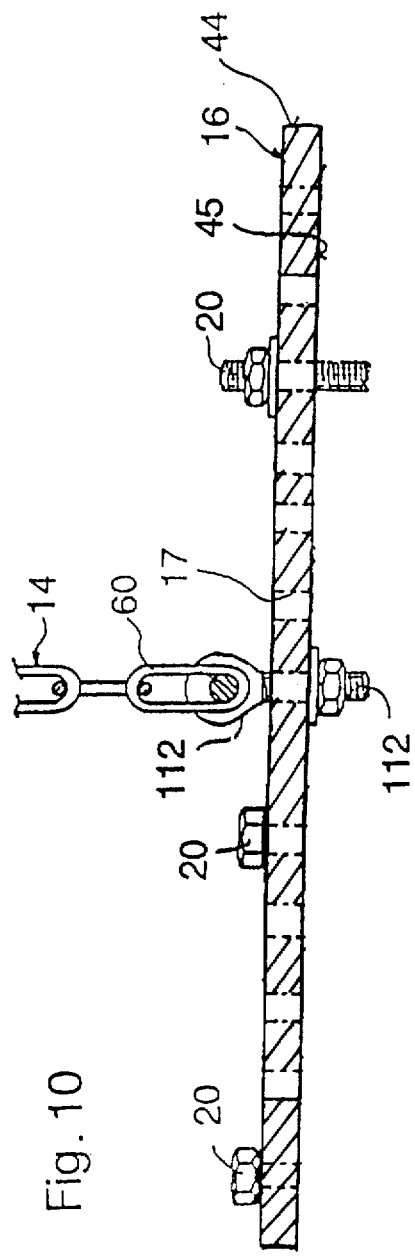
FIG. 10 is a sectional view of the support plate using a ring bolt as a coupling element.

Instead of the displaceable coupling elements 30, 31, 33, it is also possible to provide simple ring bolts 112 which can be detachably fastened in different positions, e.g., in the support holes 17 of the support plate 16 as shown in FIG. 10.

The support plate 16 is made without adjusting slots 34, 35, 36 if such ring bolts are used.

The draw spindles 20, 21, 22, which are adjustable in height on the support plate 16, 16/1 or on the support element 18, may also be designed as, e.g., connection elements adjustable in length in the manner of a turnbuckle, or as draw plates, pulling chains or pulling straps bolted to the support plate 16. Instead of the support forks 23, 24, it is also possible to provide support holes, e.g., at the lower end of a draw plate or of a draw hook.

If the points of suspension are arranged on a motor vehicle engine to be lifted such that the motor vehicle engine would tilt off during lifting in relation to the support plate 16 or 16/1 because of an unfavorable location of the center of gravity, provisions are also made for arranging one or more additional, length-adjustable support rods between the support plate 16 or 16/1 and the motor vehicle engine. Such tilting of the motor vehicle engine may occur, e.g., in the case of a two-point suspension, i.e., when only two points of suspension are provided on the motor vehicle engine, so that the motor vehicle engine can tilt around an axis which connects the two points of suspension in the case of an unfavorable location of the center of gravity. The support rods can now be bolted correspondingly into the support holes 17 of the support plate to achieve the highest possible stability, so that they cannot inadvertently slip off from the engine block and/or the support plate.

An inexpensive auxiliary element, which can be manufactured in a simple manner and which makes it possible to reach points of suspension arranged at different points in space on a motor vehicle engine or transmission for lifting same, is provided by the support plate 16 or 16/1 according to the present invention. The lifting bridge can thus be used variably for a great variety of models of vehicles, and it can always be placed in the points on the fender mounting webs which have a sufficiently high stability for lifting heavy components, e.g., a motor vehicle engine.

While specific embodiments of the invention have been shown and described in detail to illustrate the application of the principles of the invention, it will be understood that the invention may be embodied otherwise without departing from such principles.

What is claimed is:

1. A lifting bridge for an engine compartment, the bridge comprising:

support feet having means for being mounted on edges of the engine compartment;

a support rail arranged on said support feet and extending across the engine compartment;

hoisting means arranged on said support rail and for raising and lowering an object to and from said support rail with a pulling element;

a planar support plate positioned between said hoisting means and the object, said support plate being connected to said pulling element by a coupling element, said support plate and said coupling element having coupling positioning means for adjusting a position where said coupling element contacts said support plate;

connection element means for fastening to a plurality of points on said support plate and for attaching to the object.

2. A bridge in accordance with claim 1, wherein:

said coupling element is a ring bolt and said coupling positioning means fastens said ring bolt to a plurality of positions on said support plate.

3. A bridge in accordance with claim 1, wherein:

said support plate has a substantially rectangular shape and has a central longitudinal axis positionable substantially in parallel with said support rail in an initial position of said support plate;

said coupling positioning means includes an adjusting slot defined by said support plate, said adjusting slot extending substantially perpendicular to said central longitudinal axis;

said coupling positioning means also including an adjusting spindle, rotation of said adjusting spindle moving a position of said coupling element with respect to said support plate.

4. A bridge in accordance with claim 1, wherein:

said connection element means is formed as one of a draw plate, a draw spindle, a pulling chain and a pulling strap said connection element means includes one of a support fork, a draw hook and a support hole for attaching to the object;

said support plate defines a plurality of support holes for fastening to said connection element means.

5. A bridge in accordance with claim 1, wherein:

said connection element means is adjustable in length.

6. A bridge in accordance with claim 1, wherein:

said hoisting means includes a flexible said pulling element;

said support plate lies in substantially a horizontal plane;

said pulling element is designed to be repetitively detachable from said connection plate without destroying said pulling element, said coupling element and said support plate;

the object to be raised or lowered is a motor vehicle part;

a plurality of said connection elements are attached to said support plate and the motor vehicle part.

7. A bridge in accordance with claim 1, wherein:

said support plate extends into an area of the engine compartment, edges of the engine compartment adjacent said area being unsupporting of said support feet.

8. A lifting bridge for an engine compartment, the bridge comprising:

support feet having means for being mounted on edges of the engine compartment;

a support rail arranged on said support feet and extending across the engine compartment;

hoisting means arranged on said support rail and for raising and lowering an object to and from said support rail with a pulling element;

a support plate positioned between said hoisting means and the object, said support plate being connected to said pulling element by a coupling element, said support plate and said coupling element having coupling positioning means for adjusting a position where said pulling element contacts said support plate;

connection element means for fastening to a plurality of points on said support plate and for attaching to the object;

another hoisting means arranged on said support rail and for also raising and lowering the object to and from said support rail with another pulling element, said another hoisting means connecting to said support plate by another coupling element, said hoisting means and said another hoisting means being spaced from each other on said support rail;

a safety rod positioned between said hoisting means and said another hoisting means, said safety rod being mounted on said support rail in a longitudinally displaceable manner along said support rail, said safety rod being connected to said support plate by a safety coupling element, said safety rod having means for supporting said support plate, said safety rod and said support plate having safety coupling positioning means for adjusting a position where said safety rod contacts said support plate.

9. A bridge in accordance with claim 8, wherein:

said support plate has a substantially rectangular shape and has a central longitudinal axis positionable substantially in parallel with said support rail in an initial position of said support plate;

said safety coupling positioning means includes a safety adjusting slot defined by said support plate, said safety adjusting slot extending substantially perpendicular to said central longitudinal axis;

said safety coupling positioning means also including a safety adjusting spindle, rotation of said safety adjusting spindle moving a position of said safety coupling element with respect to said support plate.

10. A bridge in accordance with claim 8, wherein:

said safety rod is pivotally connected to said safety coupling element.

11. A lifting bridge for an engine compartment, the bridge comprising:

support feet having means for being mounted on edges of the engine compartment;

a support rail arranged on said support feet and extending across the engine compartment;

hoisting means arranged on said support rail and for raising and lowering an object to and from said support rail with a pulling element;

a support plate positioned between said hoisting means and the object, said support plate being connected to said pulling element by a coupling element, said support plate and said coupling element having coupling positioning means for adjusting a position where said pulling element contacts said support plate;

connection element means for fastening to a plurality of points on said support plate and for attaching to the object;

a support element connected to said support plate and extending beyond an edge of said support plate, said support element including means for attaching to said connection element means, said support element and said support plate including means for positioning said support element in a plurality of different directions.

12. A lifting bridge for an engine compartment, the bridge comprising:

support feet having means for being mounted on edges of the engine compartment;

a support rail arranged on said support feet and extending across the engine compartment;

hoisting means arranged on said support rail and for raising and lowering an object to and from said support rail with a pulling element;

a support plate positioned between said hoisting means and the object, said support plate being connected to said pulling element by a coupling element, said support plate and said coupling element having coupling positioning means for adjusting a position where said pulling element contacts said support plate;

connection element means for fastening to a plurality of points on said support plate and for attaching to the object;

said support plate has a substantially rectangular shape and has a central longitudinal axis positionable substantially in parallel with said support rail in an initial position of said support plate, said support plate defining an opening;

said support plate includes an adjusting plate, said coupling positioning means includes an adjusting slot defined by said adjusting plate, said adjusting slot extending substantially perpendicular to said central longitudinal axis;

said coupling positioning means includes an adjusting spindle, rotation of said adjusting spindle moving a position of said coupling element with respect to said support plate in a first direction substantially perpendicular to said central longitudinal axis;

said coupling positioning means includes a guide rail means for guiding said adjusting plate in a second direction substantially parallel to said central longitudinal axis;

said coupling positioning means includes another adjusting spindle, rotation of said another adjusting spindle moving a position of said coupling element with respect to said support plate in said second direction;

said coupling element is positioned in said opening of said support plate and said slot of said adjusting plate.

* * * * *